US011981009B2

(12) United States Patent
Huang

(10) Patent No.: US 11,981,009 B2
(45) Date of Patent: May 14, 2024

(54) WIRE BENDING SPRING AND A FASTENER DRIVING TOOL WITH THE SAME

(71) Applicant: PAO SHEN ENTERPRISES CO., LTD., Chang Hua (TW)

(72) Inventor: Tsung-Wen Huang, Chang Hua (TW)

(73) Assignee: Pao Shen Enterprises Co., Ltd., Chang Hua (TW)

( * ) Notice: Subject to any disclaimer, the term of this patent is extended or adjusted under 35 U.S.C. 154(b) by 8 days.

(21) Appl. No.: 17/846,507

(22) Filed: Jun. 22, 2022

(65) Prior Publication Data

US 2023/0278180 A1 Sep. 7, 2023

(30) Foreign Application Priority Data

Mar. 3, 2022 (TW) ................................. 111107799
Mar. 25, 2022 (TW) ................................. 111111456

(51) Int. Cl.
*B25C 5/04* (2006.01)
*B25C 5/02* (2006.01)
*B25C 5/11* (2006.01)

(52) U.S. Cl.
CPC .............. *B25C 5/04* (2013.01); *B25C 5/0292* (2013.01); *B25C 5/11* (2013.01)

(58) Field of Classification Search
CPC ........... B25C 5/04; B25C 5/0292; B25C 5/11; B25C 5/06; B25C 5/0285; B25C 5/10
See application file for complete search history.

(56) References Cited

U.S. PATENT DOCUMENTS 2,314,847 A * 3/1943 Polzer ........................ B25C 5/06 227/132
4,014,493 A * 3/1977 Wolfe ..................... B25C 5/025 227/120
2017/0182645 A1* 6/2017 Marks ................... B25C 5/0228
2017/0239798 A1* 8/2017 Marks ........................ B25C 5/06
2021/0178566 A1* 6/2021 Captarencu ........... B25C 5/1658

* cited by examiner

*Primary Examiner* — Veronica Martin
(74) *Attorney, Agent, or Firm* — Burris Law, PLLC

(57) ABSTRACT

A fastener driving tool includes a magazine unit, a handle, a striking plate, an energy restoring member and a wire bending spring disposed to a housing unit. The housing unit includes an inner housing assembly made from a plastic material, and an outer housing assembly made from a metal material and covering the inner housing assembly. The wire bending spring is biased for storing a striking energy for the striking plate, and includes an extending section and a backwinding section. The extending section has first and second ends. The backwinding section is connected with the second end, and extends and bends toward the first end to terminate at a terminal end portion. The ratio of a height to a width ranges from 1:1 to 1:1.6.

5 Claims, 16 Drawing Sheets

WIRE BENDING SPRING AND A FASTENER DRIVING TOOL WITH THE SAME

CROSS-REFERENCE TO RELATED APPLICATION

This application claims priorities of Taiwanese Patent Application No. 111107799, filed on Mar. 3, 2022, and Taiwanese Patent Application No. 111111456, filed on Mar. 25, 2022.

FIELD

The disclosure relates to a fastener driving tool, and more particularly to a wire bending spring and a fastener driving tool with the same.

BACKGROUND

Referring to FIGS. 1 and 2, a conventional spring actuated fastener driving tool as disclosed in TWI365800 includes a housing 91, a handle 92 pivotably connected to the housing 91, a striking plate 93, a leaf spring 94, a magazine 95 mounted within the housing 91, and a disengaging means. The housing 91 is composed of two metal-made lateral plates 911 and a metal-made front plate 912 to define an accommodation space with a fastener striking opening at a lower end. When the handle 92 is pressed downwardly to move the striking plate 93 from a ready position toward a striking position, the leaf spring 94 is resiliently deflected and loaded. Once the striking plate 93 reaches the striking position, a control end 921 of the handle 92 is disengaged from a control slot 931 of the striking plate 93 and at this moment the leaf spring 94 is thus freed to resiliently return the striking plate 93 to the ready position and to eject a fastener.

However, the leaf spring 94 is made from a metal sheet in a stamping process, and has two axial tubes 941 soldered on top and bottom surfaces for connecting with two mounting axles of the housing 91, which is troublesome to conduct. The front plate 912 is made by stamping a metal sheet and is formed with a punching space for movement of the leaf spring 94 and the front end of the handle 92. The manufacturing process of the housing 91 is also complicated which increases the manufacturing cost. Although the housing 91 may be made of plastic to be manufactured more easily, the thickness thereof must be increased to provide sufficient structural strength, which adversely affects the appearance thereof. Furthermore, in order to facilitate a stable sliding movement of the magazine 95 in the housing 91, bottom edges are formed and bent from the lateral plates 911, and a positioning cover must be disposed to position the magazine 95, which complicates the structure of the housing 91 and increases the manufacturing cost.

SUMMARY

Therefore, an object of the disclosure is to provide a wire bending spring and a fastener driving tool with the same that can alleviate at least one of the drawbacks of the prior art.

According to the disclosure, the wire bending spring is mountable on a fastener driving tool to be biased for storing a striking energy in an up-and-down direction, and includes an extending section extending along an axis to have a first end and a second end opposite to each other along the axis, and a backwinding section having a connected end portion which is connected with the second end. The backwinding section extends and bends from the connected end portion toward the first end to terminate at a terminal end portion. The wire bending spring has a cross-section which defines a width perpendicular to both the axis and the up-and-down direction, and a height perpendicular to the axis and parallel to the up-and-down direction. The ratio of the height to the width ranges from 1:1 to 1:1.6.

According to the disclosure, the fastener driving tool includes a housing unit, a magazine unit, a handle, a striking plate, an energy restoring member and a wire bending spring disposed in the housing unit. The housing unit includes an inner housing assembly which is made from a plastic material and defines an accommodation space therein, and an outer housing assembly which is made from a metal material. The inner housing assembly has a fastener striking opening formed therein and in communication with the accommodation space. The magazine unit is mounted within the housing unit. The handle is pivotably mounted to the housing unit. The striking plate is mounted within the housing unit and is driven with an operation of the handle for movement in an up-and-down direction from the fastener striking opening outwardly of the housing unit. The energy restoring member is mounted within the housing unit, and is compressed by the handle to store a return energy. The wire bending spring is mounted within the housing unit to be biased for storing a striking energy for the striking plate in the up-and-down direction.

The wire bending spring is simple in shape, which is makes it easy to manufacture the spring and mount the spring to the housing unit. Also, the housing unit has the outer housing assembly made from a metal material and the inner housing assembly made from a plastic material and covered by the outer housing assembly so as to reinforce the structural strength of the tool and enhance the aesthetic appeal of the tool.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
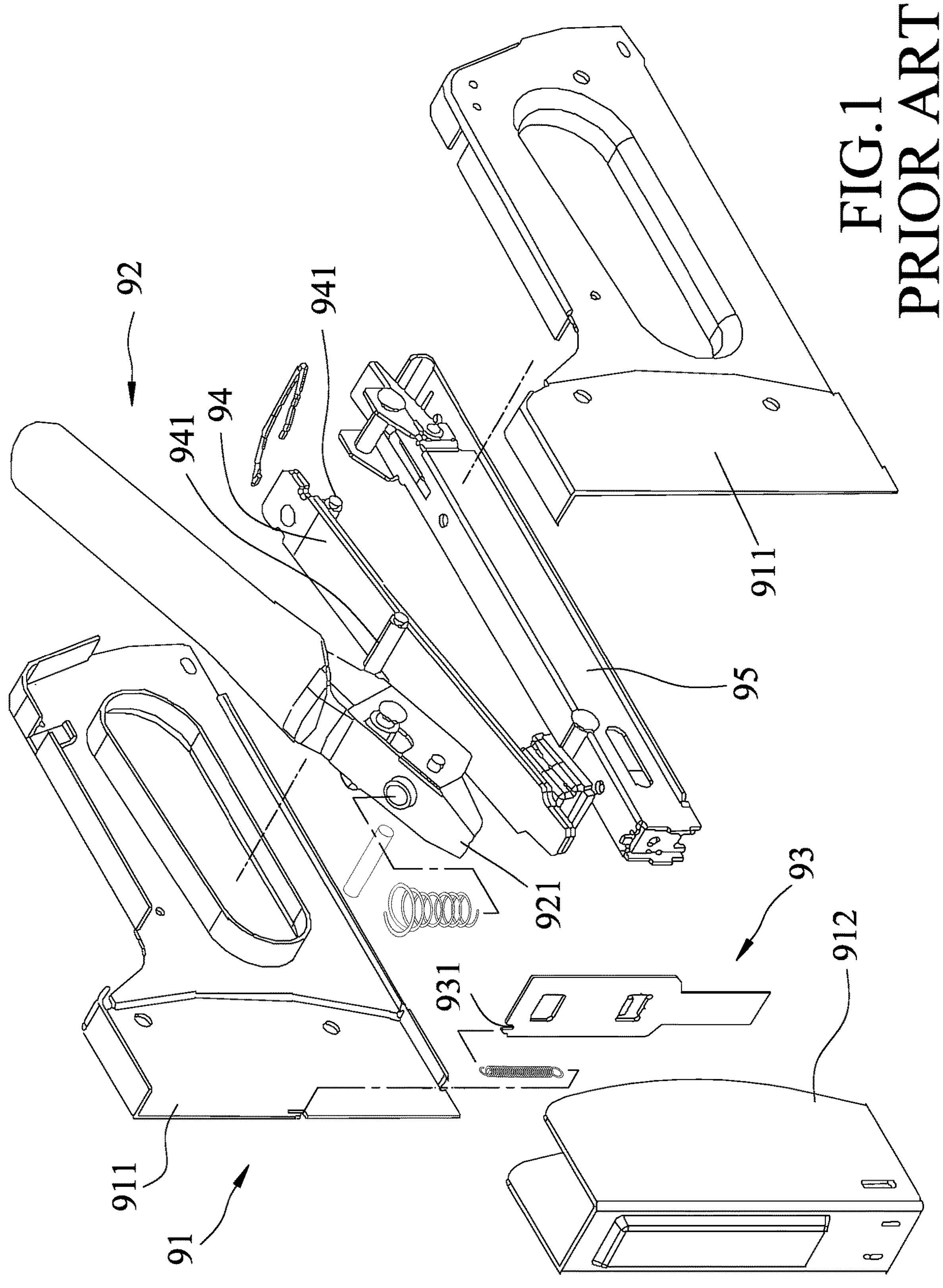
FIG.1 PRIOR ART
FIG. 1 is an exploded perspective view of a conventional spring actuated fastener driving tool.
Figure 2:
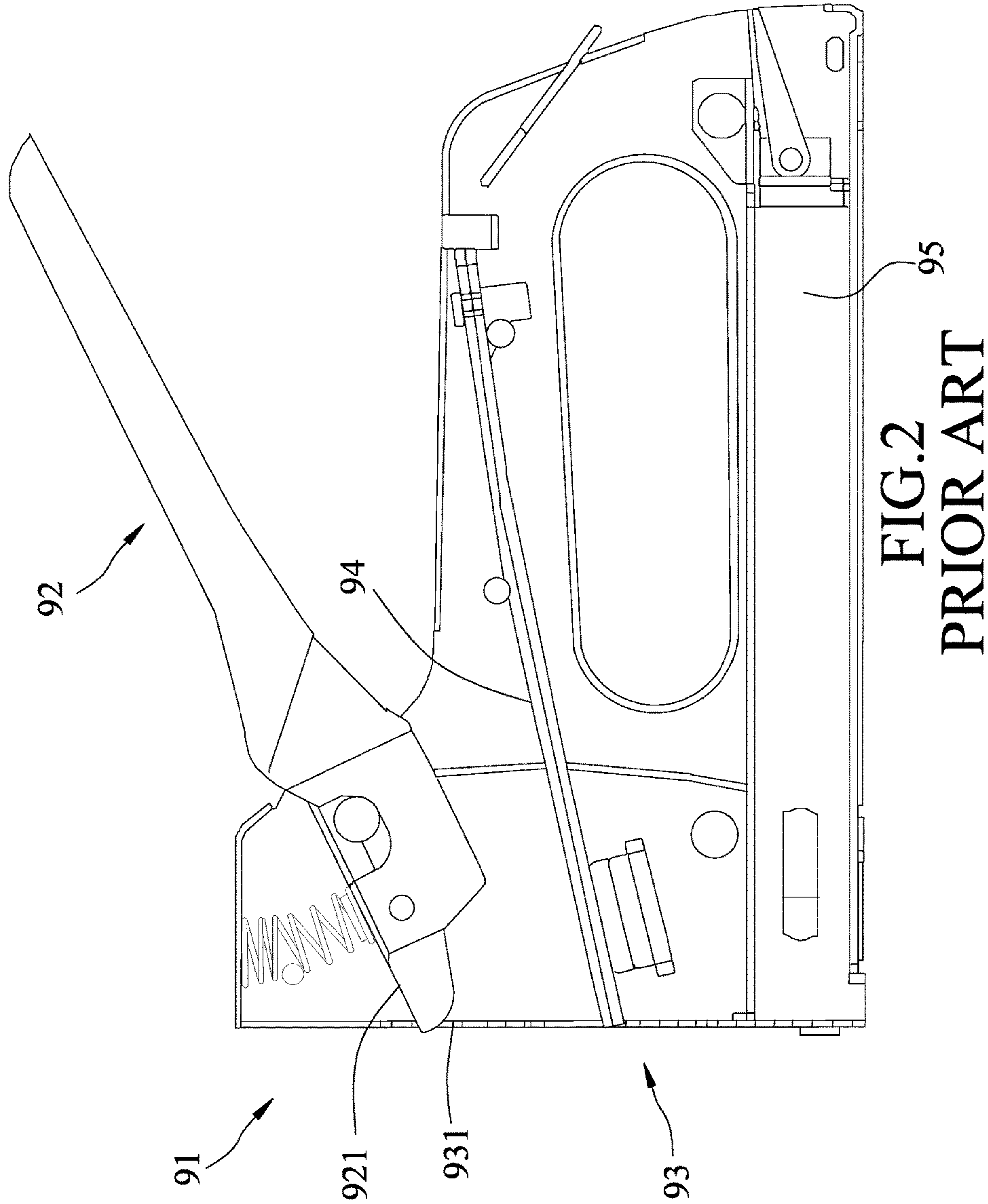
FIG.2 PRIOR ART
FIG. 2 is a schematic plan view of the conventional fastener driving tool in a ready position.
Figure 3:
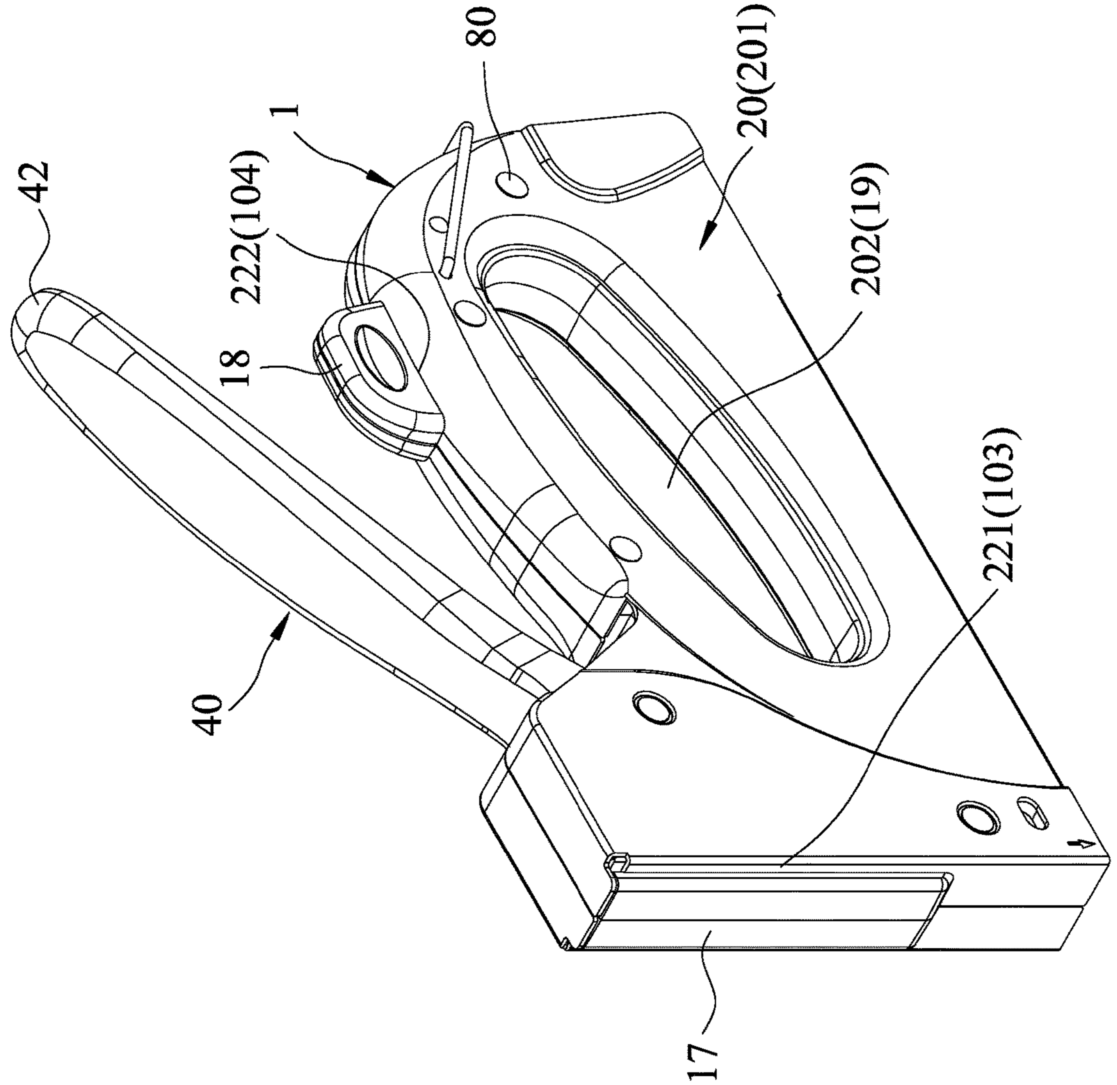
FIG. 3 is a perspective view illustrating an embodiment of a fastener driving tool according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics. In the following description, directions, such as "front-and-rear direction", "left-and-right direction" and "up-and-down direction", indicate the orientations of the embodiments in use.

Referring to FIGS. 3 to 6, an embodiment of a fastener driving tool according to the disclosure is shown to include a housing unit 1, a magazine unit 30, a handle 40, a striking plate 50, an energy restoring member 60 and a wire bending spring 70 disposed to the housing unit 1.

With reference to FIGS. 7 to 12, the housing unit 1 includes an inner housing assembly 10 which is made from a plastic material and defines an accommodation space 101 therein, and an outer housing assembly 20 which is made from a metal material and covers and surrounds the inner housing assembly 10.

The inner housing assembly 10 includes two inner housing halves 11 which are matingly engaged with each other to define the accommodation space 101. The inner housing assembly 10 has two lateral walls 12 opposite to each other in a left-and-right direction, a front end wall 13 interconnecting the lateral walls 12, a rear end wall 14 opposite to the front end wall 13 in a front-and-rear direction, an upper end wall 15 interconnecting the front and rear end walls 13, 14, a lower end wall 16 opposite to the upper end wall 15 in an up-and-down direction and having a fastener striking opening 161 in communication with the accommodation space 101, a forward projecting seat 17 projecting forwardly from the front end wall 13 and defining a front compartment 171 in communication with the accommodation space 101, an upward projecting seat 18 projecting upwardly from the upper end wall 15, an inner mounting hole 19 extending through the lateral walls 12 in the left-and-right direction, two first engaging slots 102 respectively formed in the lateral walls 12 and surrounding the inner mounting hole 19, two second engaging slots 103 each formed in a juncture of the front end wall 13 and the forward projecting seat 17, and two third engaging slots 104 each formed in a juncture of the upper end wall 15 and the upward projecting seat 18, and a sliding slot 105 formed adjacent to the front compartment 171. Each inner housing half 11 has a lower edge 111 which defines the lower end wall 16, a recess 112 which is recessed from the lower edge 111, a partition wall 113 which is disposed above the recess 112 and parallel to the lower edge 111, a middle stem 114 which is disposed above the inner mounting hole 19, a supporting portion 115 which is disposed adjacent to the front compartment 171, a rear stem 116 which is disposed above the inner mounting hole 19 and at a rear side of the middle stem 114, a positioning block 117 which is disposed adjacent to the rear stem 116, and a retaining slot 118 which is formed between the rear stem 116 and the positioning block 117. Each inner housing half 11 is made of a plastic material and formed by injection molding to have the forward projecting seat 17, the upward projecting seat 18, the inner mounting hole 19, the first engaging slots 102, the second engaging slots 103, the third engaging slots 104, the sliding slot 105, the recess 112, the partition wall 113, the middle stem 114, the supporting portion 115, the rear stem 116 and the positioning block 117.

The outer housing assembly 20 includes two outer housing halves 201 which are matingly engaged with each other and cover the inner housing assembly 10. Each outer housing half 201 is made by stamping a metal sheet, and is disposed outboard of the respective inner housing half 11. Each outer housing half 201 has an inner peripheral edge 21 which defines an outer mounting hole 202, an outer peripheral edge 22 which borders the outer housing half 201, a lower plate 23 which is disposed below the recess 112 to cooperatively define a rail 106, and an abutting tab 24 which is disposed on a rear side of the lower plate 23. The inner peripheral edge 21 is matingly engaged in the respective first engaging slot 102 to align the inner mounting hole 19 with the outer mounting hole 202. The outer peripheral edge 22 has a front engaging portion 221 matingly engaged in the respective second engaging slot 103 and corresponding with the forward projecting seat 17, and an upper engaging portion 222 matingly engaged in the respective third engaging slot 104 and corresponding with the upward projecting seat 18.

The magazine unit 30 is slidably mounted in the accommodation space 101 of the housing unit 1, and has a pair of sliding keys 31 which are slidably mounted in the rails 106 of the outer housing assembly 20. The partition walls 113 of the inner housing halves 11 are disposed to border the sliding space for the magazine unit 30.

The handle 40 is pivotably mounted to the housing unit 1, and has an actuating end 41 insertable into the front compartment 171, and a pressed end 42 disposed opposite to the actuating end 41 and outwardly of the housing unit 1.

The striking plate 50 is slidably mounted in the sliding slots 105, and has an upper actuated hole 51 which is engaged with the actuating end 41 of the handle 40, a lower actuated hole 52 below the upper actuated hole 51, and a striking end 53 below the lower actuated hole 52. The striking plate 50 is driven by operation of the handle 40 to move in the up-and-down direction so that the striking end 53 extends from the fastener striking opening 161 outwardly of the housing unit 1.

The energy restoring member 60 is mounted in the accommodation space 101 of the housing unit 1, and is compressed by the actuating end 41 of the handle 40 to store a return energy for the handle 40.

Figure 6:
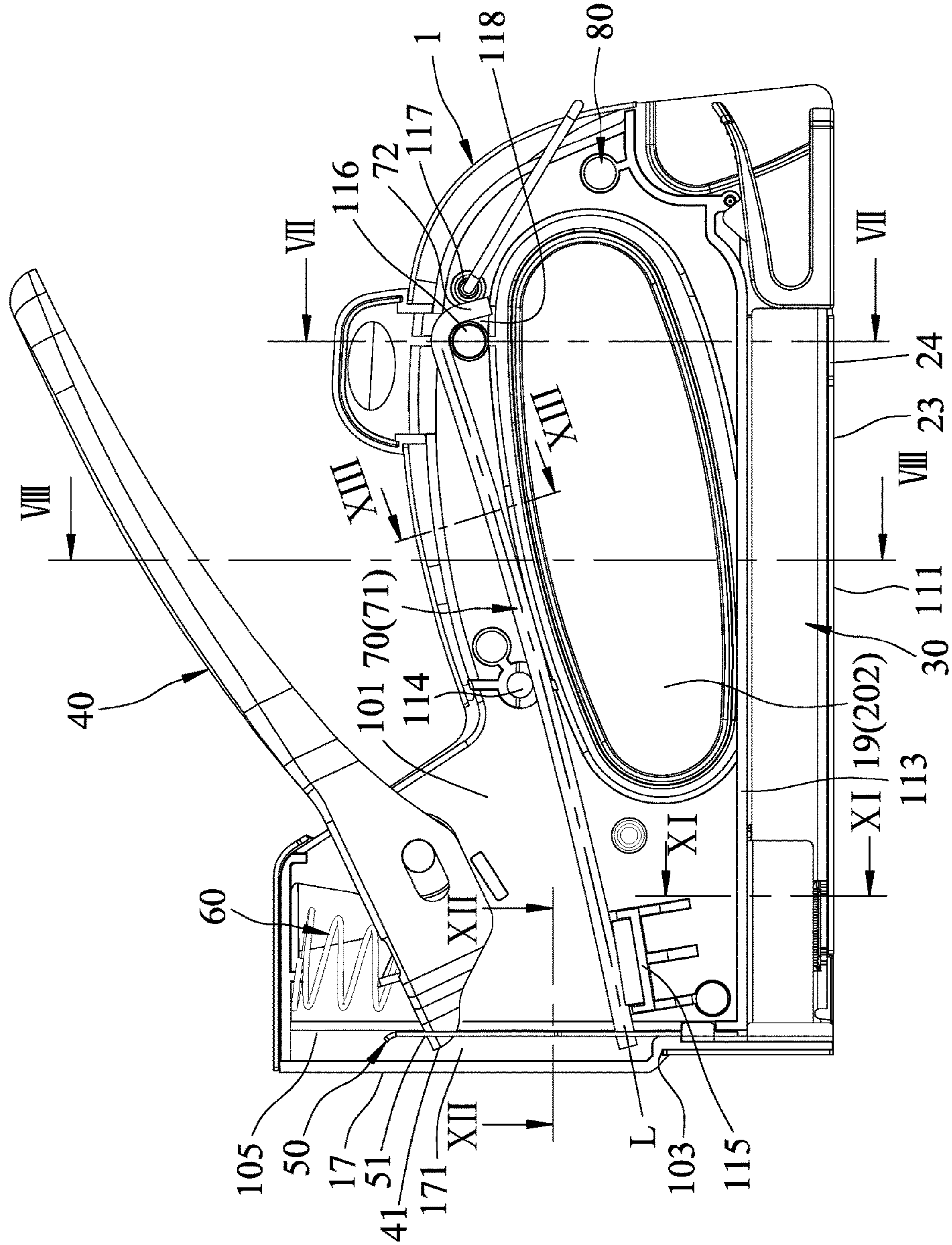
FIG. 6 is a partly sectional side view of the embodiment.
Figure 7:
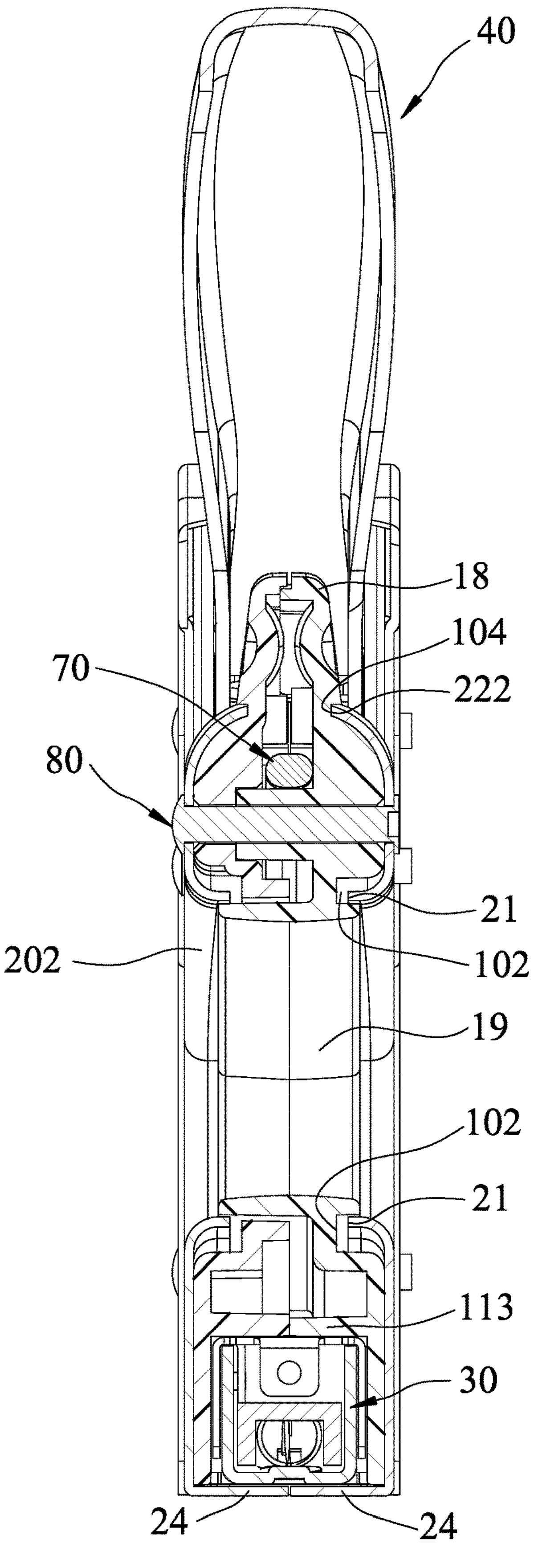
FIG. 7 is a sectional view taken along line VII-VII of FIG. 6.
Figure 8:
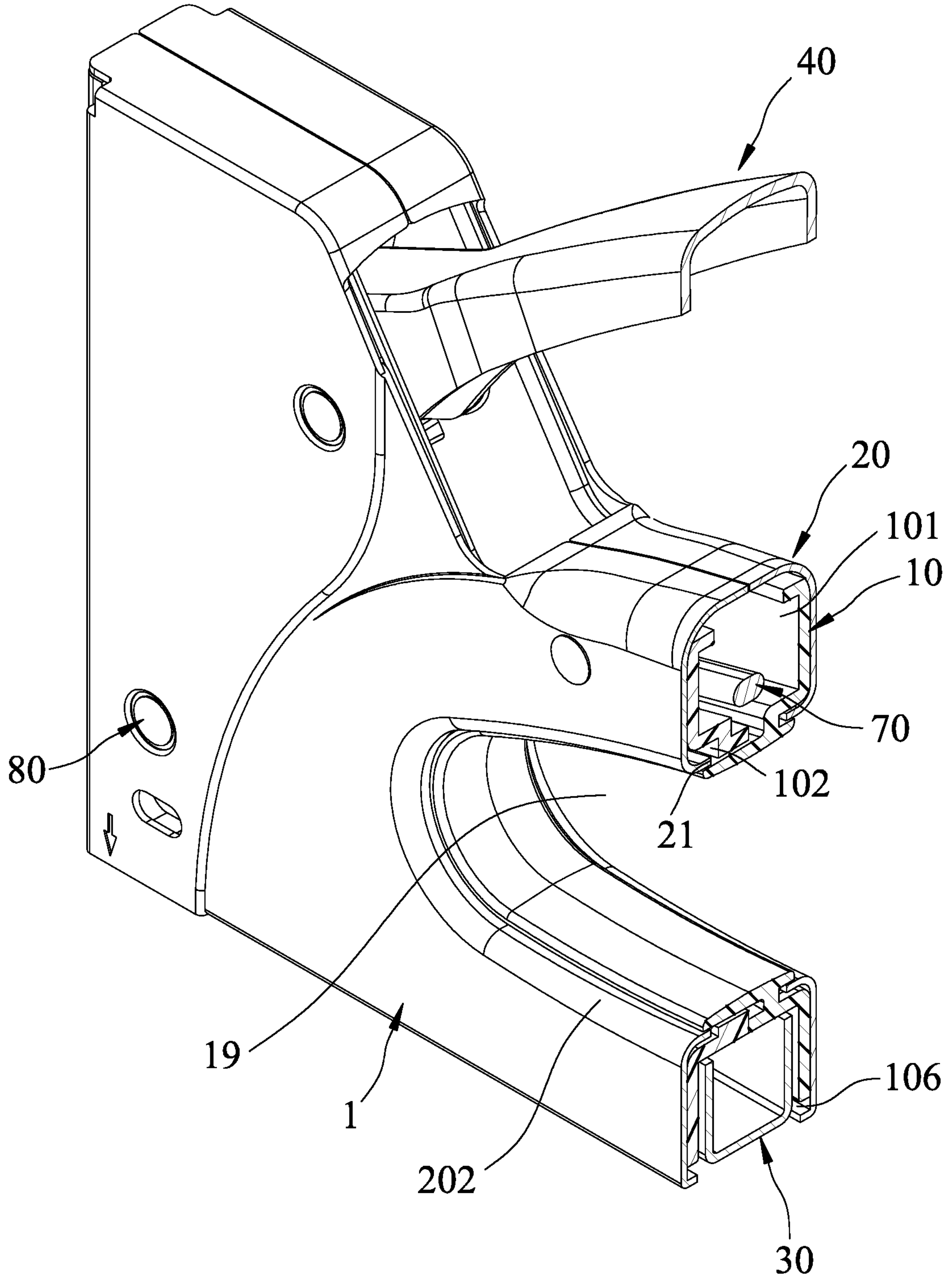
FIG. 8 is a fragmentary perspective view of the embodiment, with a section taken along line VIII-VIII of FIG. 6.
Figure 9:
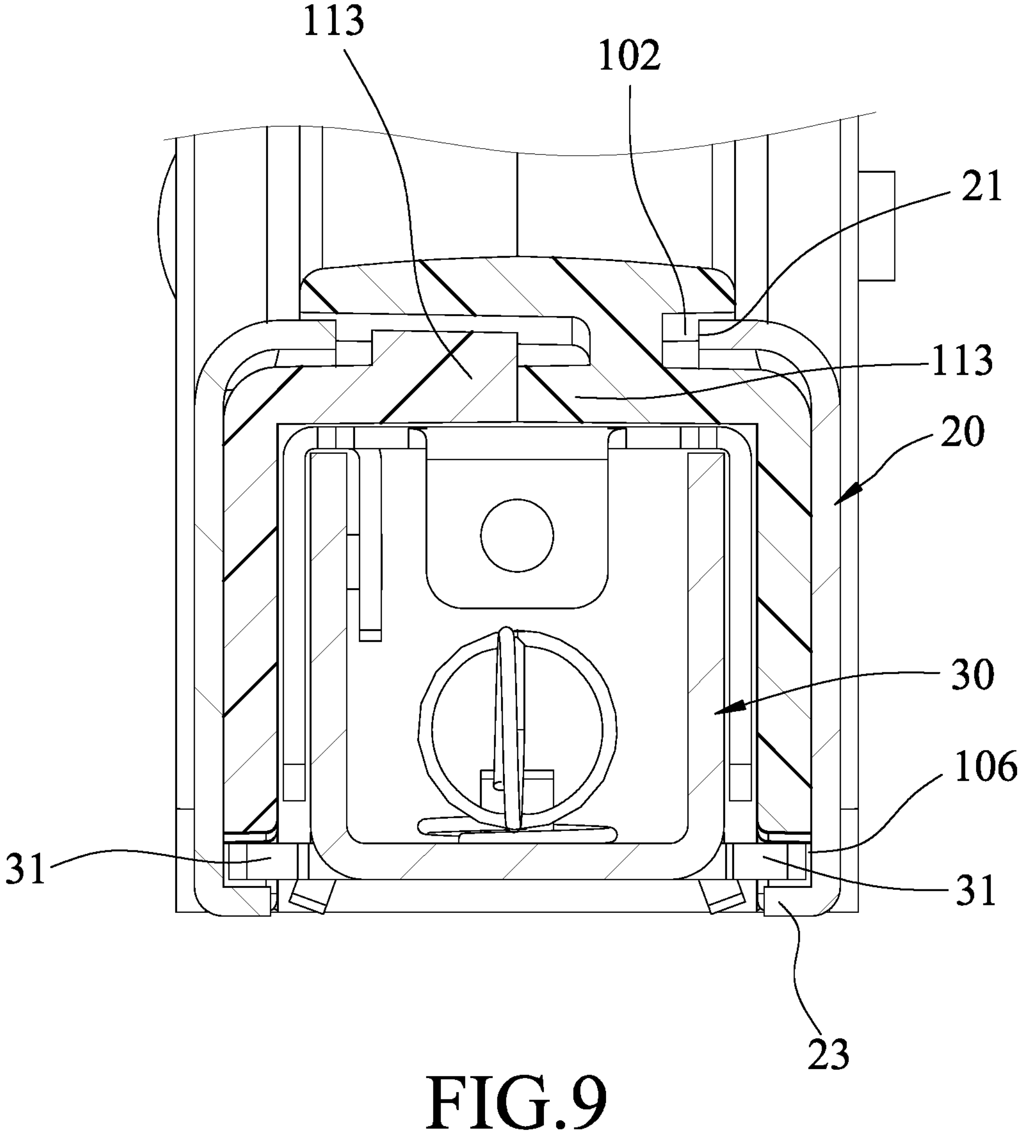
FIG. 9 is a fragmentary enlarged view of a portion of FIG. 8.
Figure 10:
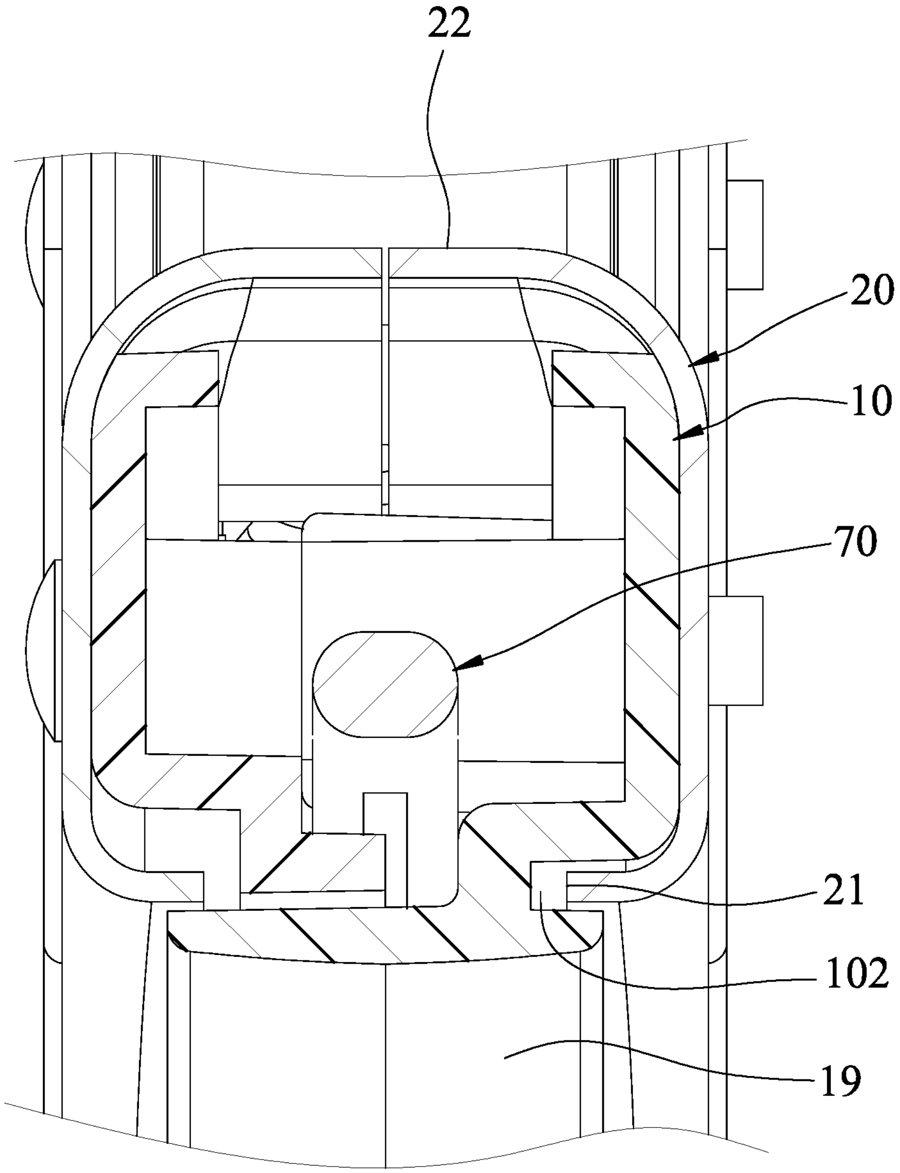
FIG. 10 is a fragmentary enlarged view of another portion of FIG. 8.
Figure 11:
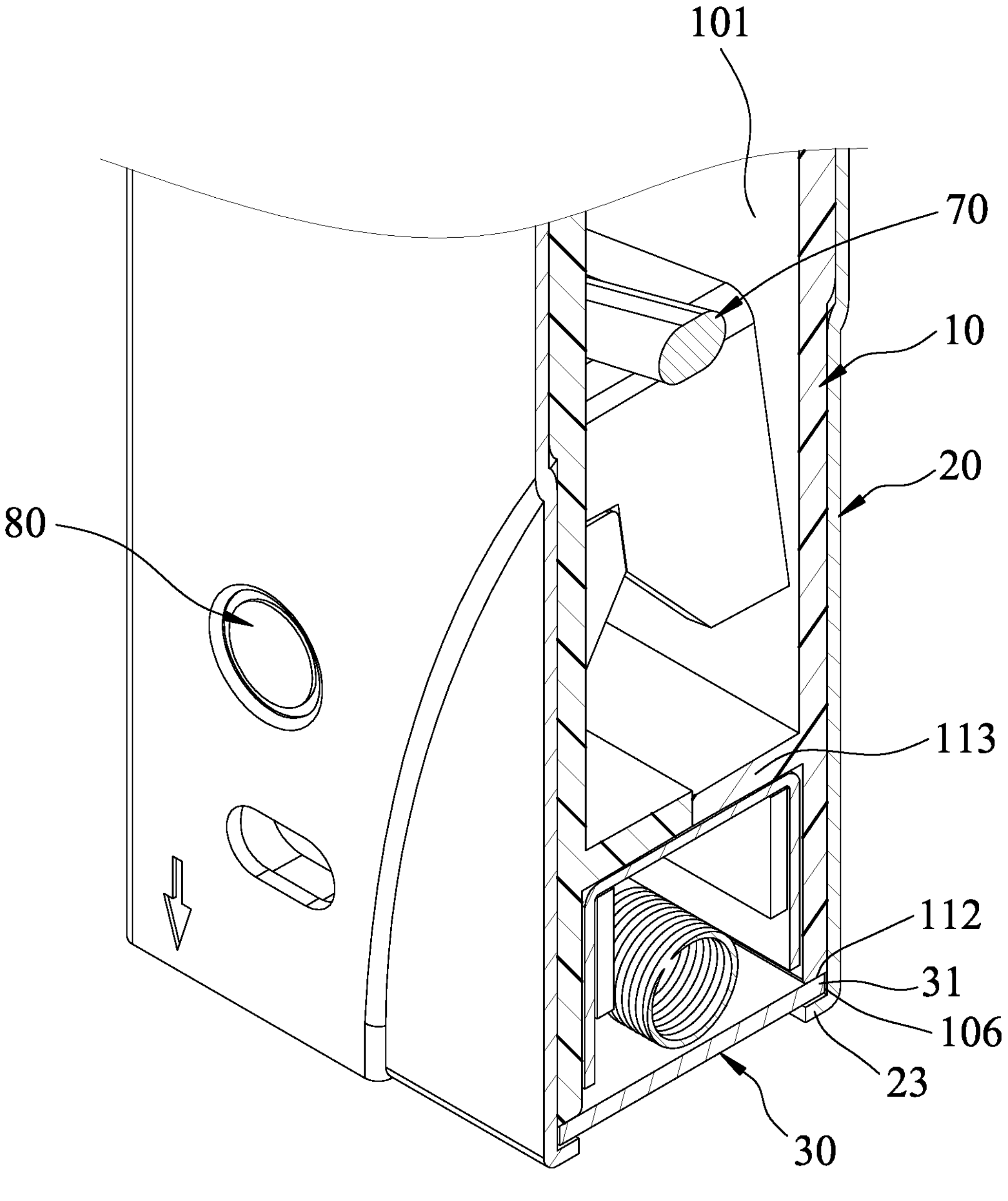
FIG. 11 is a fragmentary perspective view of the embodiment, with a section taken along line XI-XI of FIG. 6.
Figure 12:
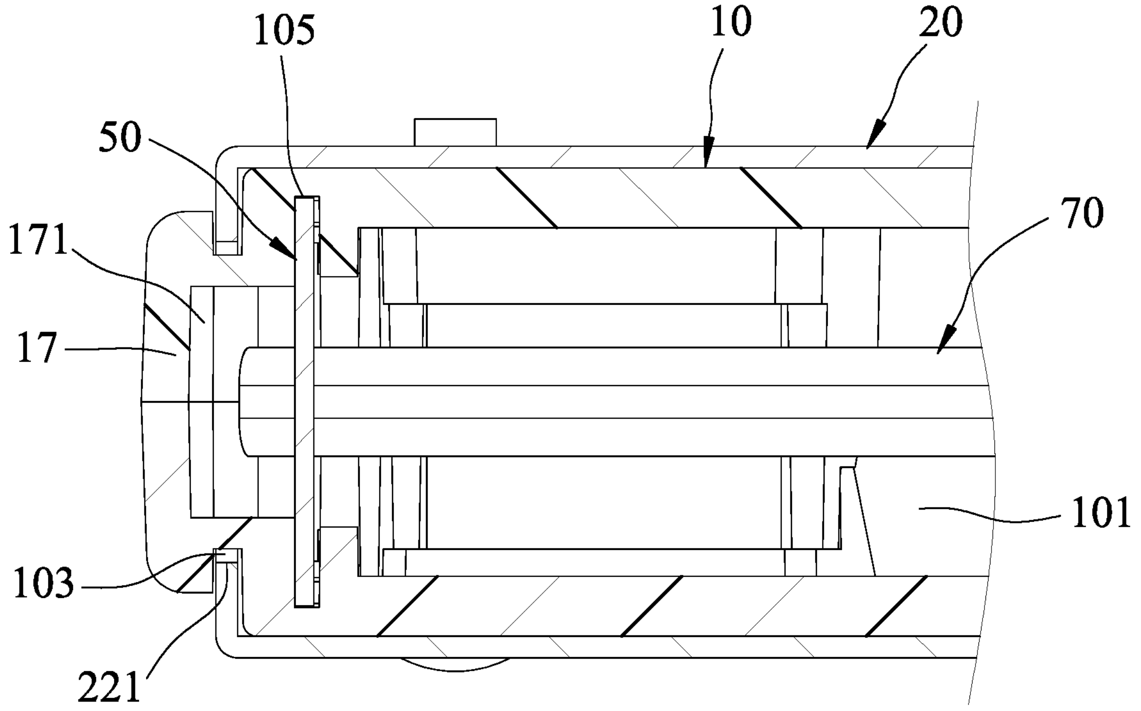
FIG. 12 is a sectional view taken along line XII-XII of FIG. 6.
Figure 13:
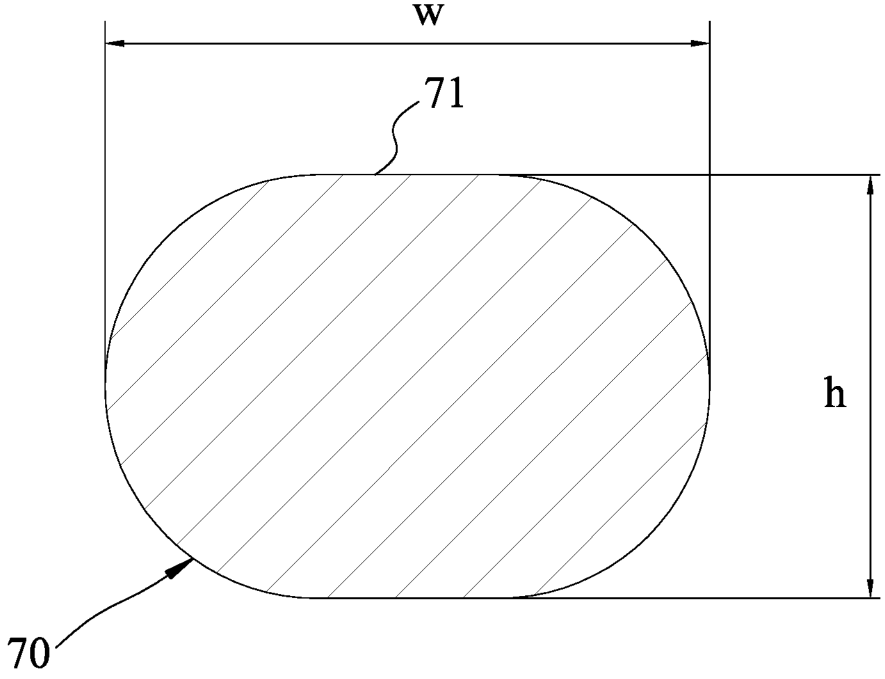
FIG. 13 is a sectional view taken along line XIII-XIII of FIG. 6.

The wire bending spring 70 is formed by bending a metal wire, and is mounted in the accommodation space 101 of the housing unit 1 to be biased for storing a striking energy for the striking plate 50 in the up-and-down direction. The wire bending spring 70 includes an extending section 71 and a backwinding section 72. The extending section 71 has a first end 711 which is engaged in the lower actuated hole 52 of the striking plate 50, and extends along an axis (L) to terminate at a second end 712. The backwinding section 72 has a connected end portion 721 which is connected with the second end 712, and extends and bends from the connected end portion 721 toward the first end 711 to terminate at a terminal end portion 722. In this embodiment, the extending section 71 and the backwinding section 72 of the wire bending spring 70 are configured to form an L-shape. As shown in FIG. 6, the extending section 71 has a front portion supported on the supporting portion 115 and a middle portion abutting against a lower side of the middle stem 114. A juncture between the extending section 71 and the backwinding section 72 is retained on the rear stem 116 and the backwinding section 72 is retained in the retaining slot 118 and gripped between the rear stem 116 and the positioning block 117. The extending section 71 is a straight rod in an original state. As shown in FIG. 13, the wire bending spring 70 has an even cross-section which defines a width (w) perpendicular to both the axis (L) and the up-and-down direction, and a height (h) perpendicular to the axis (L) and parallel to the up-and-down direction. The ratio of the height (h) to the width (w) ranges from 1:1 to 1:1.6. In this embodiment, the width (w) is larger than the height (h), and the cross-section of the wire bending spring 70 is of an oval shape, but it is not limited to this.

Figure 4:
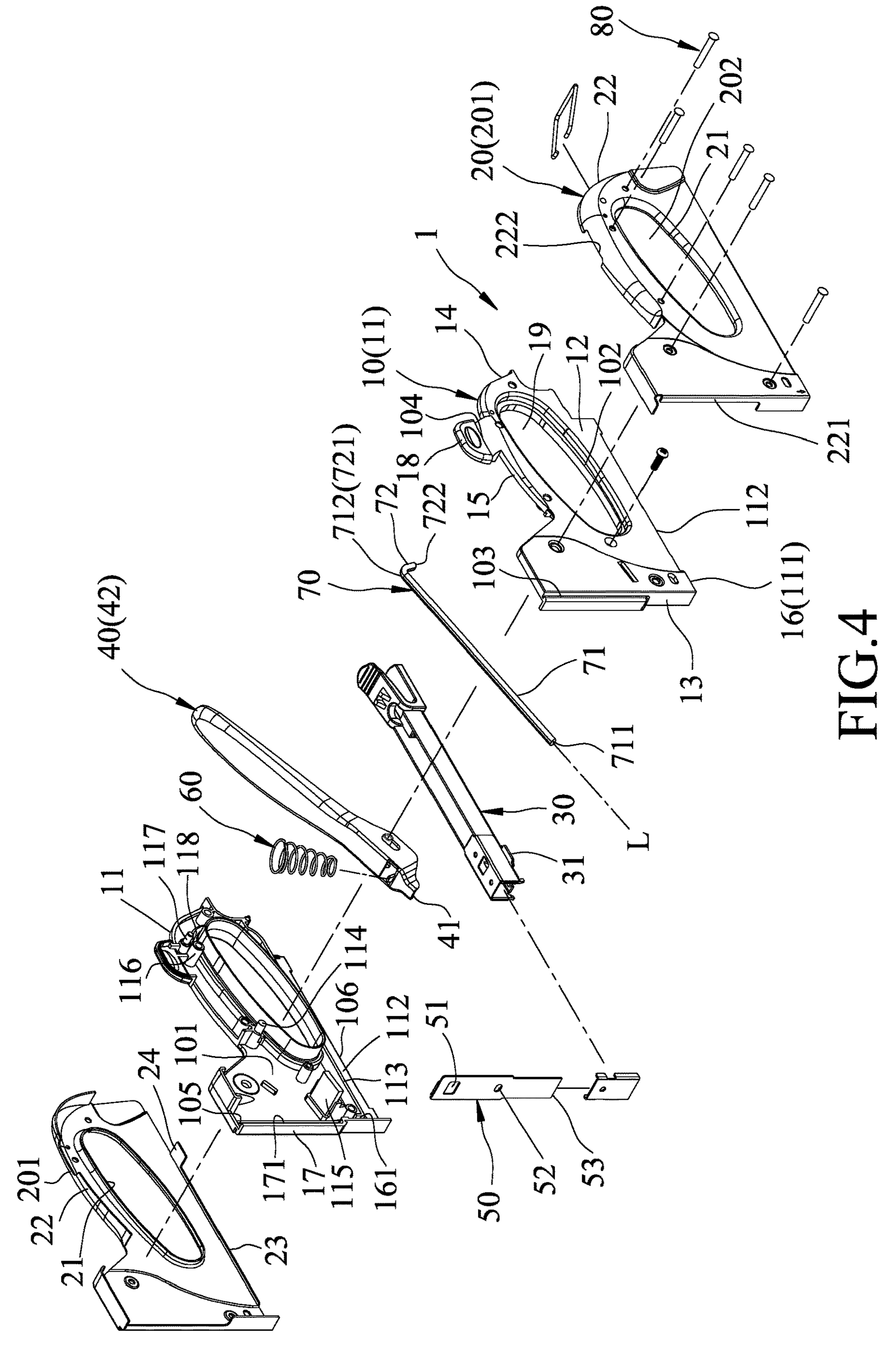
FIG. 4 is an exploded perspective view of the embodiment.
Figure 5:
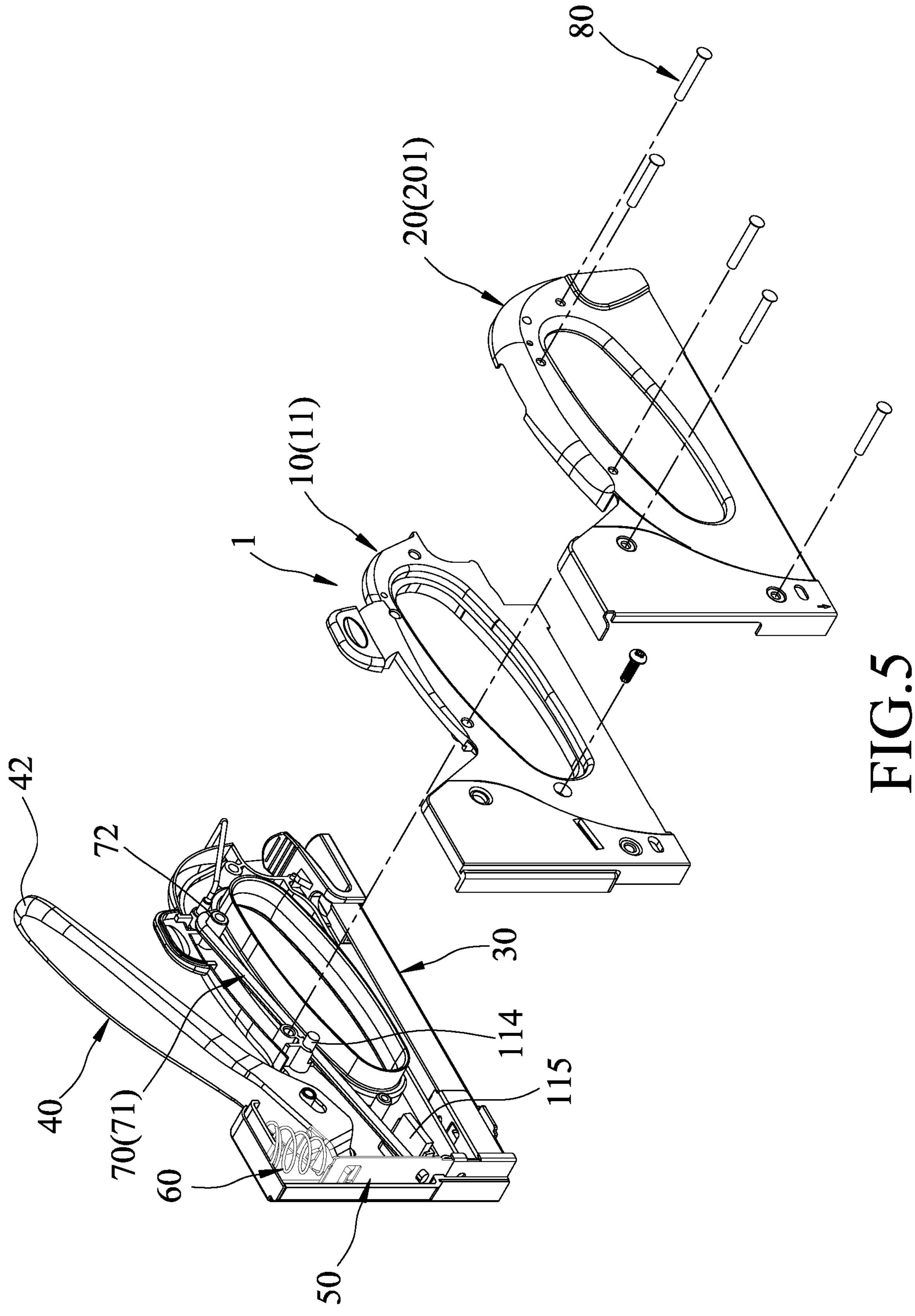
FIG. 5 is a partly exploded perspective view of the embodiment.

With reference to FIGS. 4 and 6, when the assembling of the component parts interior of the housing unit 1 is completed, the outer housing halves 201 are coupled with each other by means of rivets 80. In a non-used position, the handle 40 is biased by the energy restoring member 60 and the actuating end 41 is engaged in the upper actuated hole 51 of the striking plate 50 to hold the striking plate 50 in a non-striking position.

When the pressed end 42 of the handle 40 is pressed to move the striking plate 50 upward to a ready position (the energy restoring member 60 is compressed by the handle 40 to store the return energy), the extending section 71 of the wire bending spring 70 is brought by the striking plate 50 and is elastically curved to be preloaded with a downward potential energy. In a striking position, the actuating end 41 is disengaged from the upper actuated hole 51 while the wire bending spring 70 is freed to release a biasing energy to move the striking plate 50 downward for performing a fastener striking stroke. Then, the wire bending spring 70 is elastically returned back to its original form to move the striking plate 50 upward, and the handle 40 is returned to the ready position by means of the energy restoring member 60 to engage the actuating end 41 with the upper actuated hole 51.

In this embodiment, the wire bending spring 70 is made by bending a metallic wire. Also, the inner housing halves 11 are by plastic molding to form the middle stems 114, the supporting portions 115, the rear stems 116 and the positioning blocks 117 which are disposed to support and hold steadily the wire bending spring 70 between the inner housing halves 11. The wire bending spring 70 is easier to manufacture and assemble and the costs are reduced thereof. The ratio of the height (h) to the width (w) of the wire bending spring 70 ranges from 1:1 to 1:1.6 so as to reinforce the structural strength of the spring 70. The number of the wire bending spring 70 may be increased to enhance the flexibility thereof.

Moreover, the housing unit 1 includes the inner housing assembly 10 made from a plastic material and the outer housing assembly 20 made from a metal material and covering the inner housing assembly 10. The inner housing assembly 10 is formed with the front compartment 171 during the injection process without further machining. Additionally, the inner peripheral edges 21 of the outer housing assembly 20 are matingly engaged in the first engaging slots 102, the front engaging portions 221 of the outer peripheral edges 22 are matingly engaged in the second engaging slots 103, and the upper engaging portions 222 are matingly engaged in the third engaging slots 104, which facilitates retaining of the outer housing assembly 20 to the inner housing assembly 10, and prevents undesired edge curling of the outer housing assembly 20. Also, by having the inner housing assembly 10 being made of a plastic material, and the outer housing assembly 20 being made of a metal material, the housing unit 1 will have improved structural strength and enhanced aesthetic appeal.

Furthermore, with the lower plate 23 and the corresponding recess 112 cooperatively defining the rail 106, and the partition walls 113 bordering over the sliding space for the magazine unit 30, the magazine unit 30 is steadily and smoothly slidable relative to the housing unit 1 without an additional positioning cover for the magazine unit 30, which simplifies the structure of the tool and reduces the manufacturing cost.

Figure 14:
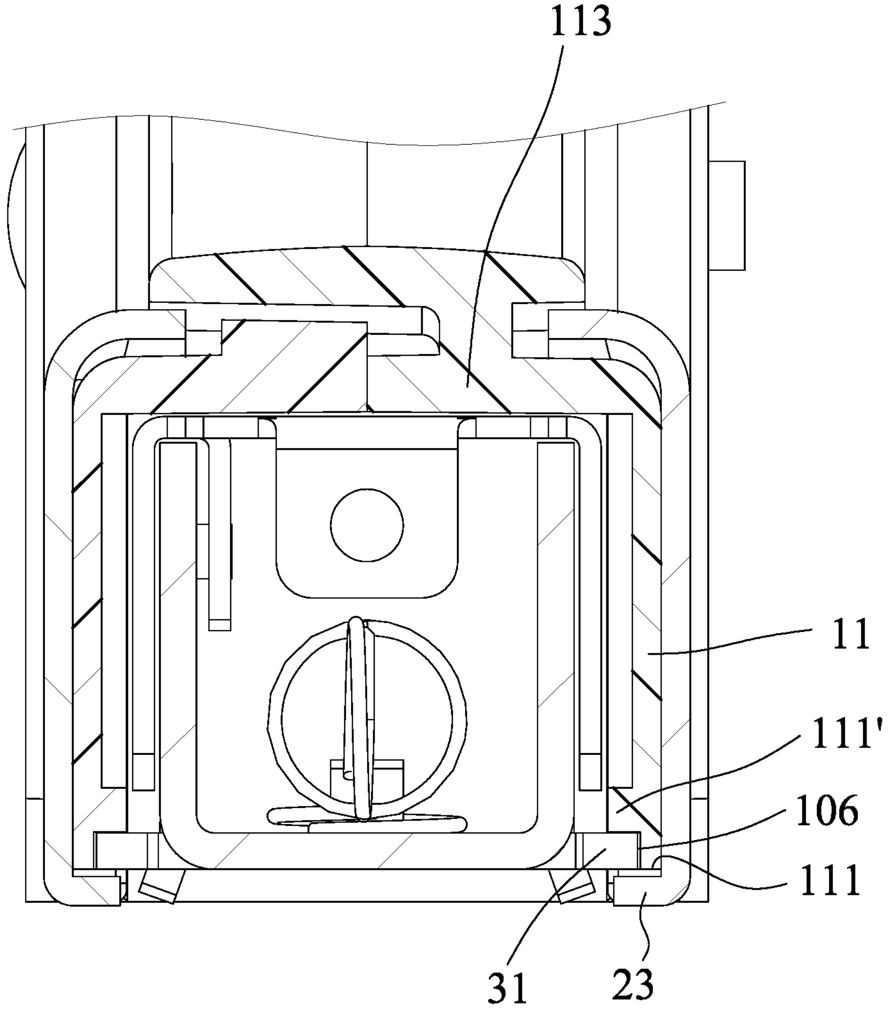
FIG. 14 is a view similar to FIG. 9, with an inner housing assembly in a modified form.

With reference to FIG. 14, alternatively, instead of the recess, a rib 111' is formed on an inboard side of each inner housing half 11 adjacent to the lower edge 111. The lower plate 23 cooperates with the corresponding rib 111' to define the rail 106 therebetween.

Figure 15:
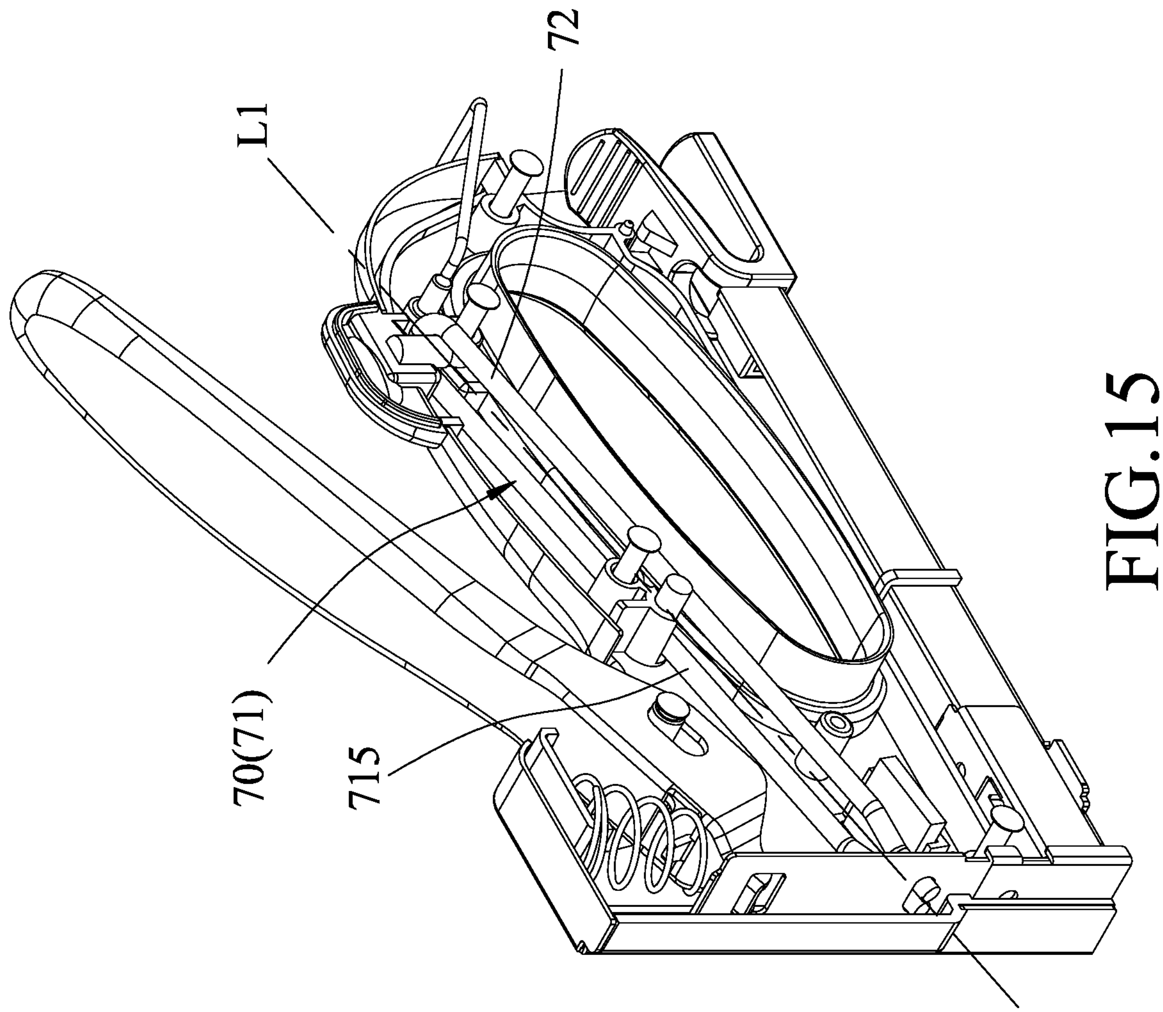
FIG. 15 is a perspective view illustrating another embodiment of the fastener driving tool according to the disclosure, wherein a portion of a housing unit of the embodiment is removed for the sake of clarity.
Figure 16:
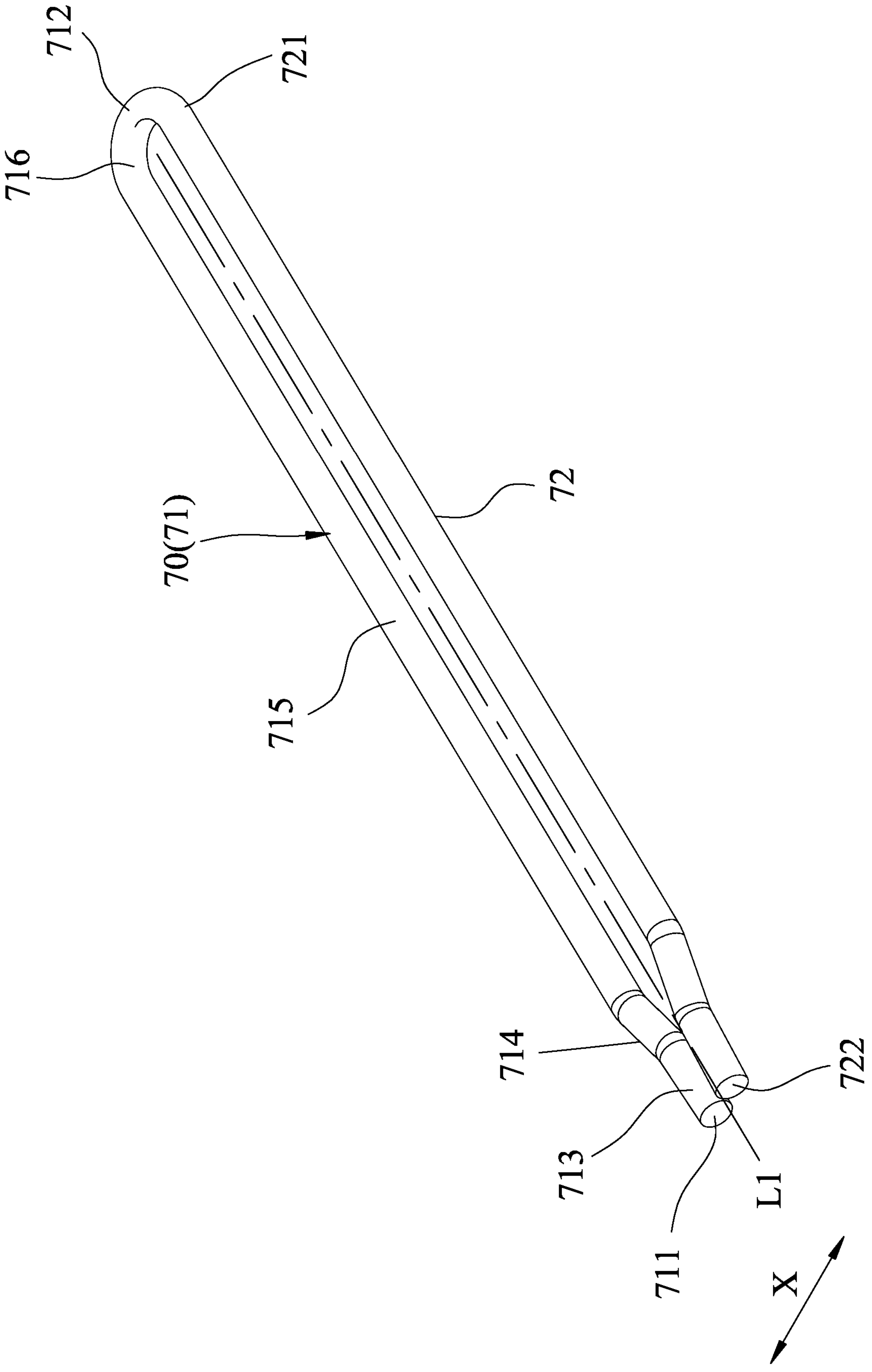
FIG. 16 is a perspective view of a wire bending spring of the embodiment in FIG. 15.

With reference to FIGS. 15 and 16, a wire bending spring 70 of another embodiment is shown. The wire bending spring 70 defines a middle line (L1) parallel to the axis (L) such that the extending section 71 and the backwinding section 72 are disposed at two opposite sides of the middle line (L1) and are mirror images and symmetric to each other in the left-and-right direction (X). The extending section 71 further has a front portion 713 which extends from the first end 711 and is close to the middle line (L1), an inclined portion 714 which extends from the front portion 713 and is inclined away from the middle line (L1), a straight portion 715 which extends from the inclined portion 714 along the axis (L), and a curve portion 716 which extends and bends from the straight portion 715 toward the middle line (L1) to terminate at the second end 712 such that the straight portion 715 is more remote from the middle line (L1) than the front portion 713 is.

It is noted that other configurations of the wire bending springs can be used for the fastener driving tool of the disclosure, such as the wire bending spring configured to have a C-shaped tubular backwinding section, or an arrow-shaped juncture between the extending section and the backwinding section.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A wire bending spring mountable on a fastener driving tool to be biased for storing a striking energy in an up-and-down direction, comprising:

an extending section extending along an axis to have a first end and a second end opposite to each other along the axis; and a backwinding section having a connected end portion which is connected with said second end, said backwinding section extending and bending from said connected end portion toward said first end to terminate at a terminal end portion, said wire bending spring having a cross-section which defines a width perpendicular to both the axis and the up-and-down direction, and a height perpendicular to the axis and parallel to the up-and-down direction, the ratio of the height to the width ranging from 1:1 to 1:1.6, said wire bending spring defining a middle line parallel to the axis such that said extending section and said backwinding section are disposed at two opposite sides of the middle line and are mirror images and symmetric to each other in a left-and-right direction that is perpendicular to the axis, said extending section having a front portion which extends from said first end and is close to the middle line, an inclined portion which extends from said front portion and is inclined away from the middle line, a straight portion which extends from said inclined portion along the axis, and a curve portion which extends and bends from said straight portion toward the middle line to terminate at said second end such that said straight portion is remoter from the middle line than said front portion is.

2. A fastener driving tool comprising:

a housing unit including an inner housing assembly which is made from a plastic material and defines an accommodation space therein, and an outer housing assembly which is made from a metal material, said inner housing assembly having a fastener striking opening formed therein and in communication with said accommodation space;

a magazine unit mounted within said housing unit;

a handle pivotably mounted to said housing unit;

a striking plate mounted within said housing unit and driven with an operation of said handle for movement in an up-and-down direction from said fastener striking opening outwardly of said housing unit;

an energy restoring member mounted within said housing unit and compressed by said handle to store a return energy; and a wire bending spring mounted within said housing unit to be biased for storing a striking energy for said striking plate in the up-and-down direction, said wire bending spring including an extending section and a backwinding section, said extending section having a first end which is engaged with said striking plate and extending along an axis to terminate at a second end, said backwinding section having a connected end portion which is connected with said second end, and extending and bending from said connected end portion toward said first end to terminate at a terminal end portion, said wire bending spring having a cross-section which defines a width perpendicular to both the axis and the up-and-down direction, and a height perpendicular to the axis and parallel to the up-and-down direction, the ratio of the height to the width ranging from 1:1 to 1:1.6, wherein said inner housing assembly has two lateral walls opposite to each other, a front end wall interconnecting said lateral walls, a rear end wall opposite to said front end wall, an upper end wall interconnecting said front and rear end walls, a lower end wall opposite to said upper end wall and having said fastener striking opening, a forward projecting seat projecting forwardly from said front end wall and defining a front compartment in communication with said accommodation space, an upward projecting seat projecting upwardly from said upper end wall, an inner mounting hole extending through said lateral walls, two first engaging slots respectively formed in said lateral walls and surrounding said inner mounting hole, two second engaging slots each formed in a juncture of said front end wall and said forward projecting seat, and two third engaging slots each formed in a juncture of said upper end wall and said upwardly projecting seat, said outer housing assembly including two outer housing halves which are matingly engaged with each other and cover said inner housing assembly, each of said outer housing halves having an inner peripheral edge which defines an outer mounting hole, and an outer peripheral edge which borders said outer housing half, said inner peripheral edge being engaged in a respective one of said first engaging slots, said outer peripheral edge being engaged in a respective one of said second engaging slots and a respective one of said third engaging slots.

3. The fastener driving tool as claimed in claim 2, wherein said inner housing assembly including two inner housing halves which are matingly engaged with each other, each of said inner housing halves having a lower edge which defines said lower end wall, a recess which is recessed from said lower edge, and a partition wall which is disposed above said recess and parallel to said lower edge, each of said outer housing halves being disposed outboard of a respective one of said inner housing halves and having a lower plate which is disposed below said recess to cooperatively define a rail, said magazine unit having two sliding keys which are respectively and slidably mounted in said rails of said outer housing halves, said partition walls of said inner housing halves being disposed to border a sliding space for said magazine unit.

4. The fastener driving tool as claimed in claim 2, wherein said extending section and said backwinding section of said wire bending spring are configured to form an L-shape.

5. A fastener driving tool comprising:

a housing unit including an inner housing assembly which is made from a plastic material and defines an accommodation space therein, and an outer housing assembly which is made from a metal material, said inner housing assembly having a fastener striking opening formed therein and in communication with said accommodation space;

a magazine unit mounted within said housing unit;

a handle pivotably mounted to said housing unit;

a striking plate mounted within said housing unit and driven with an operation of said handle for movement in an up-and-down direction from said fastener striking opening outwardly of said housing unit;

an energy restoring member mounted within said housing unit and compressed by said handle to store a return energy; and a wire bending spring mounted within said housing unit to be biased for storing a striking energy for said striking plate in the up-and-down direction, said wire bending spring including an extending section and a backwinding section, said extending section having a first end which is engaged with said striking plate and extending along an axis to terminate at a second end, said backwinding section having a connected end portion which is connected with said second end, and extending and bending from said connected end portion toward said first end to terminate at a terminal end portion, said wire bending spring having a cross-section which defines a width perpendicular to both the axis and the up-and-down direction, and a height perpendicular to the axis and parallel to the up-and-down direction, the ratio of the height to the width ranging from 1:1 to 1:1.6, wherein said wire bending spring defines a middle line parallel to the axis such that said extending section and said backwinding section are disposed at two opposite sides of the middle line and are mirror images and symmetric to each other in a left-and-right direction that is perpendicular to the axis, said extending section having a front portion which extends from said first end and is close to the middle line, an inclined portion which extends from said front portion and is inclined away from the middle line, a straight portion which extends from said inclined portion along the axis, and a curve portion which extends and bends from said straight portion toward the middle line to terminate at said second end such that said straight portion is remoter from the middle line than said front portion is.

* * * * *